US005637675A

United States Patent [19]
Le Mehaute et al.

[11] Patent Number: 5,637,675
[45] Date of Patent: Jun. 10, 1997

[54] FERROMAGNETIC CRYSTALLINE COMPOUNDS OF COPOLYMERS OF NAPHTHYLAMINE DERIVATIVES AND AMINOAROMATIC COMPOUNDS

[75] Inventors: Alain Le Mehaute, Gif sur Yvette; Stanislas Galaj, Arcueil; Denis Cottevieille, Montreuil; François Tsobnang, Paris; François Lefort, Lanvallay, all of France

[73] Assignee: Alcatel Alsthom Compagnie Generale d'Electricite, Paris-Cedex, France

[21] Appl. No.: 433,205

[22] Filed: May 2, 1995

[30] Foreign Application Priority Data

May 6, 1994 [FR] France .................................. 94 05610

[51] Int. Cl.$^6$ ................................................ C08G 73/00
[52] U.S. Cl. ........................ 528/422; 525/540; 528/423; 528/424
[58] Field of Search .................... 528/422, 423, 528/424; 525/540

[56] References Cited

U.S. PATENT DOCUMENTS 5,371,182 12/1994 Galaj et al. ............................ 528/422

FOREIGN PATENT DOCUMENTS

0545819A1 6/1993 European Pat. Off. .

OTHER PUBLICATIONS

*Polymer Journal*, vol. 24, No. 9, 1992, Tokyo, Japan, pp. 857–864, XP000330631, Yoshizawa et al, "Crystal Orbital Study on Ferromagentic State of Poly(m–aniline)".

*Patent Abstracts of Japan*, vol. 12, No. 482 (C–553) 15 Dec. 1988 & JP-A-63 199 741 (Mitsui Minning & Smelting Company, Ltd.).

*Primary Examiner*—Shelley A. Dodson
*Attorney, Agent, or Firm*—Sughrue, Mion, Zinn, Macpeak & Seas

[57] ABSTRACT

Crystalline compounds with ferromagnetic properties are described which are inclusion compounds comprising metal salts in copolymers in which the repeating unit includes one unit from a first group of aminoaromatic derivatives of 1-naphthylamine and corresponding oxidized forms, connected to one unit from a second group of substituted aminoaromatic compounds selected from substituted amines containing at least two condensed benzene nuclei, substituted polycyclic compounds containing at least one aniline moiety in their structure, and aniline derivatives carrying a substituent connected to the nucleus by an ethynylene or para-phenylene unit, and corresponding oxidized compounds. Methods for the preparation of these compounds are also described.

9 Claims, 1 Drawing Sheet

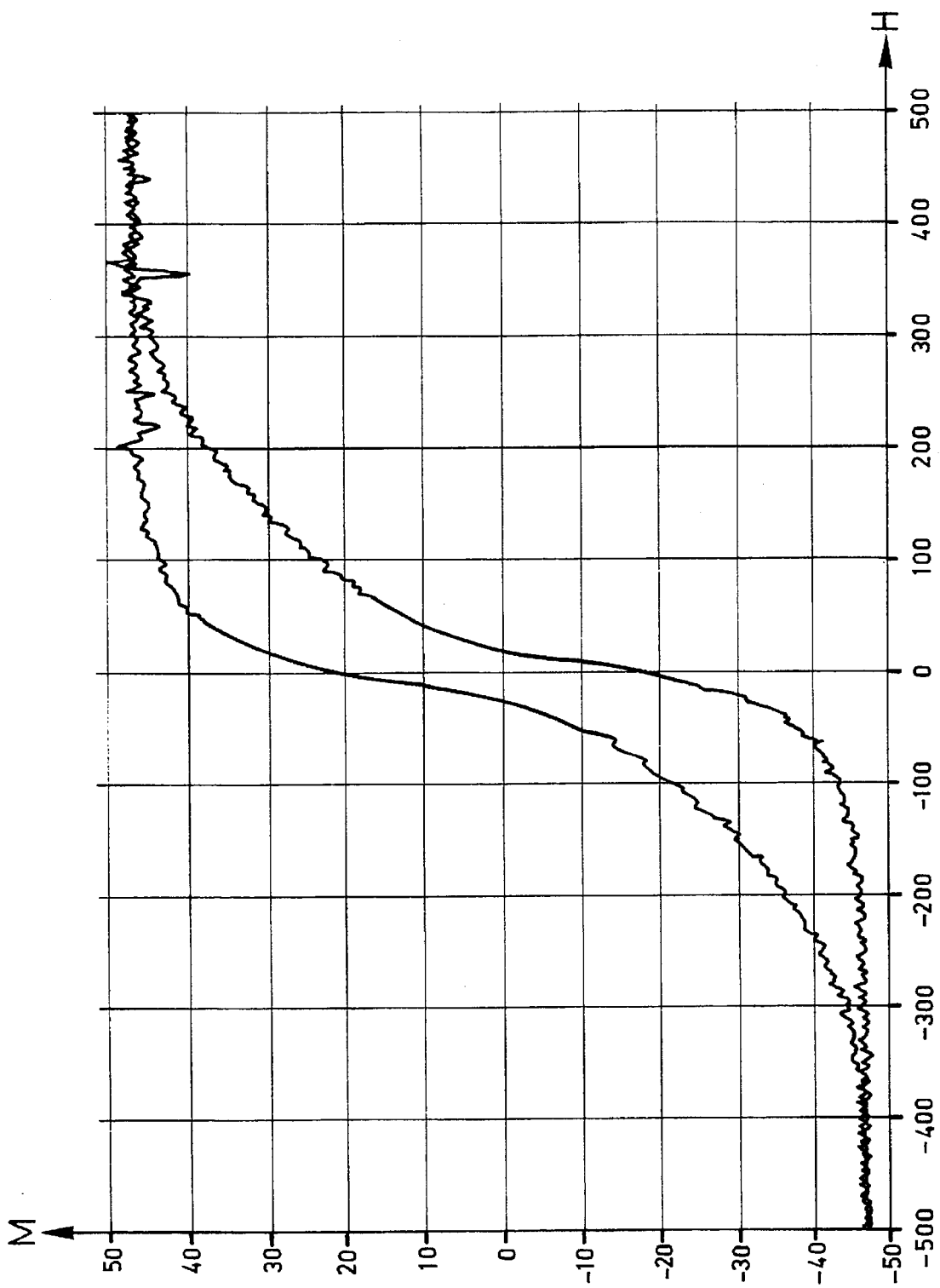

FERROMAGNETIC CRYSTALLINE COMPOUNDS OF COPOLYMERS OF NAPHTHYLAMINE DERIVATIVES AND AMINOAROMATIC COMPOUNDS

BACKGROUND OF THE INVENTION

Field of the Invention

The present invention concerns crystalline compounds with ferromagnetic properties which are inclusion compounds comprising metal salts in copolymers in which the repeating unit includes one unit from a first group of aminoaromatic derivatives of 1-naphthylamine and corresponding oxidized forms, connected to one unit from a second group of substituted aminoaromatic compounds selected from substituted amines containing at least two condensed benzene nuclei, substituted polycyclic compounds containing at least one aniline moiety in their structure, and aniline derivatives carrying a substituent connected to the nucleus by an ethynylene or para-phenylene unit, and corresponding oxidized compounds. These copolymers form the subject matter of US patent application Ser. No. 08/313,440 filed 27 Sep. 1994. They exhibit magnetic properties, in some cases ferromagnetic properties.

The provision of other polymer based compounds which also have ferromagnetic properties would be desirable.

The present invention thus relates to crystalline compounds with ferromagnetic properties formed by the inclusion of metal salts in the copolymers described above.

SUMMARY OF THE INVENTION

The invention consists in crystalline compounds with ferromagnetic properties that are organic in origin but that are formed by the inclusion of metal salts in copolymers with a repeating unit composed of one unit from a first group of aminoaromatic derivatives of 1-naphthylamine and corresponding oxidized forms, and one unit from a second group of substituted aminoaromatic compounds selected from substituted amines containing at least two condensed benzene nuclei, substituted polycyclic compounds containing at least one aniline moiety in their structure, and aniline derivatives carrying a substituent connected to the nucleus by an ethynylene or para-phenylene unit, and corresponding oxidized compounds. The crystalline structure of these compounds corresponds to ordered cross linking of the copolymer, the metal salt being incorporated in a three-dimensional structure.

The structure of the reduced form of the compounds in the first group and those of the second group with a naphthalene nucleus includes a radical:

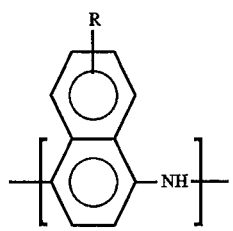

and that of the oxidized form, a radical:

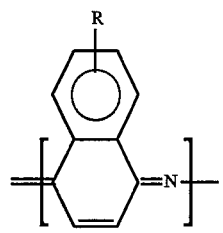

The structure of the reduced form of the compounds of the second group without a naphthalene nucleus include a radical:

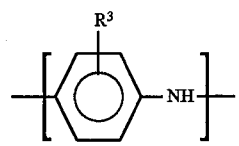

and that of the oxidized form, a radical:

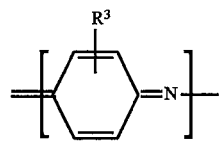

Many metal salts are suitable for producing the inclusion compounds, in particular alkaline or alkaline-earth metal salts, metals from the iron and platinum groups, rare-earth metals, and metals from classes 1B and 2B, 5A and 6A of the periodic classification of the elements. Chlorides, bromides, iodides and sulfates of copper, iron, zinc, magnesium, silver, manganese, cobalt, chromium and nickel are of particular interest because of their ferromagnetism.

The production process for these inclusion compounds is characterized in that one of the above copolymers is rendered soluble and is then complexed and precipitated by addition of a solution of the metal salt. Advantageously, precipitation is carried out in the presence of a magnetic field.

If the starting copolymer used is the copolymer obtained from aniline and beta Clève acid (5-amino-2-naphthalene sulfonic acid) by reacting the monomers in the presence of an oxidizing agent in solution in a weak acid, the copolymer is preferably re-dispersed in acetone, then decanted, the liquid phase being brought into contact with ether to precipitate a blue product. This is then separated and purified then taken up again into solution and a metal salt solution is added. The blue product obtained during this preparation, whose structure has not yet been precisely determined, already has a ferromagnetic character which is enhanced by the inclusion of a metal salt.

DETAILED DESCRIPTION OF THE INVENTION

There follows a description, given by way of example only and with reference to the accompanying single figure, of the preparation of inclusion compounds in accordance with the invention, and of the ferromagnetic properties of these compounds.

EXAMPLE 1 a) preparation of a 1:1 copolymer of aniline and beta Clève acid (5-amino-2-naphthalene sulfonic acid)

5 g of unrefined Clève acid was dissolved in 25 cm³ of aniline with agitation. After 15 minutes, 20 cm³ of acetic acid was added and left in contact for 5 minutes.

A solution containing 5 cm³ of anhydrous acetic acid and 4 cm³ of 50 vol. hydrogen peroxide was then added continuously. When all of the oxidizing solution had been introduced, centrifuging was carried out and agitation was continued for 48 hours.

b) Treatment of centrifuged concentrate

The centrifuged concentrate was redispersed in acetone, and then the dispersion was centrifuged until the supernatant liquid was almost completely translucent. About 2 mg of product was obtained which had ferromagnetic characteristics.

c) Treatment of supernatant liquid

This liquid was poured into an agitated beaker containing ether. A blue precipitate formed. The blue product, whose composition has not yet been determined, was then separated by centrifuging and washed with acetone until as much as possible of the azo derivatives had been eliminated. It was then washed with ether and dried in argon at room temperature. The mass of the recovered product corresponded to 36% of the unrefined Clève acid used.

This blue product was very soluble in methanol, soluble in ammonia, water, hydrochloric acid and acetic acid, and insoluble in toluene. Its saturation magnetization was $4.10^{-3}$ emu/g.

d) Formation of inclusion complexes from the blue product

The blue product was re-dissolved in one of these solvents. A precipitate was then formed by adding a metal salt solution and separating the product obtained. The saturation magnetization of the latter was measured.

It can be assumed, without limiting the scope of the invention, that the metal salt causes ordered three-dimensional cross linking by lodging within the lattice formed.

Respective addition of aqueous solutions of copper (II) bromide, iron (II) sulfate and zinc chloride produced compounds with saturation magnetizations of $10^{-1}$ emu/g, $4.5.10^{-2}$ emu/g and $4.2.10^{-2}$ emu/g, in yields of several percent following precipitation and washing.

The figure shows a hysteresis curve for a sample obtained from an inclusion compound of a 1:1 aniline and beta Clève acid copolymer and a copper (II) salt. The field H (in oersteds) is shown as the abscissa, with the magnetization M (in electromagnetic units) as the ordinate. The saturation magnetization of the inclusion compound was about 0.1 emu/g, its remanent magnetization was 0.08 emu/g and the coercive field was 487 oersteds.

EXAMPLE 2

The method of Example 1 was repeated up to the formation of the precipitate by addition of a metal salt solution and the separation of the product obtained. This product, which was strictly diamagnetic, was dissolved in a mixture of water and acetone to which was added a stoichiometric quantity of silver nitrate, with respect to the sulfonic radical of the copolymer. A very thin film of silver thus formed by the partial reduction of $Ag^+$ ions. The solution was filtered, then left for three days to evaporate slowly at room temperature. Crystals were obtained. The saturation magnetization of some of these crystals was measured as 0.1 emu/g.

There is claimed:

1. Crystalline compounds with ferromagnetic properties which are inclusion compounds comprising metal salts in copolymers in which the repeating unit includes one unit from a first group of aminoaromatic derivatives of 1-naphthylamine and corresponding oxidized forms, connected to one unit from a second group of aminoaromatic compounds selected from amines containing at least two condensed benzene nuclei, polycyclic compounds containing at least one aniline moiety in their structure, and aniline derivatives carrying a substituent connected to the nucleus by an ethynylene or para-phenylene unit, and corresponding oxidized compounds.

2. Crystalline inclusion compounds according to claim 1 wherein said metal salts are salts of transition elements or alkaline-earth metals.

3. Crystalline inclusion compounds according to claim 2 wherein said metal salts are salts of copper, iron, zinc, magnesium, silver, manganese, cobalt, chromium or nickel.

4. A process for the production of inclusion compounds according to claim 1 wherein a copolymer is dissolved and is then complexed and precipitated by addition of a metal salt solution.

5. A process according to claim 4 wherein precipitation is effected in a magnetic field.

6. A process according to claim 4 wherein the starting copolymer is a copolymer of aniline and beta or theta Clève acid obtained by the reaction of monomers in the presence of an oxidizing agent in solution in a weak acid, is redispersed in acetone, and is then decanted, and wherein the liquid phase is brought into contact with ether to precipitate a product which is often blue, which is then separated and purified, and is then taken up into solution and added to the metal salt solution.

7. A "blue" ferromagnetic compound resulting from the precipitation following treatment of the liquid phase by ether in the process according to claim 6.

8. A "green" ferromagnetic compound resulting from the precipitation following treatment of the liquid phase by ether in the process according to claim 6.

9. A process for the production of crystalline inclusion compounds in accordance with claim 1, wherein said product is left in solution and subsequently crystallized.

* * * * *